Figures 1, 2:
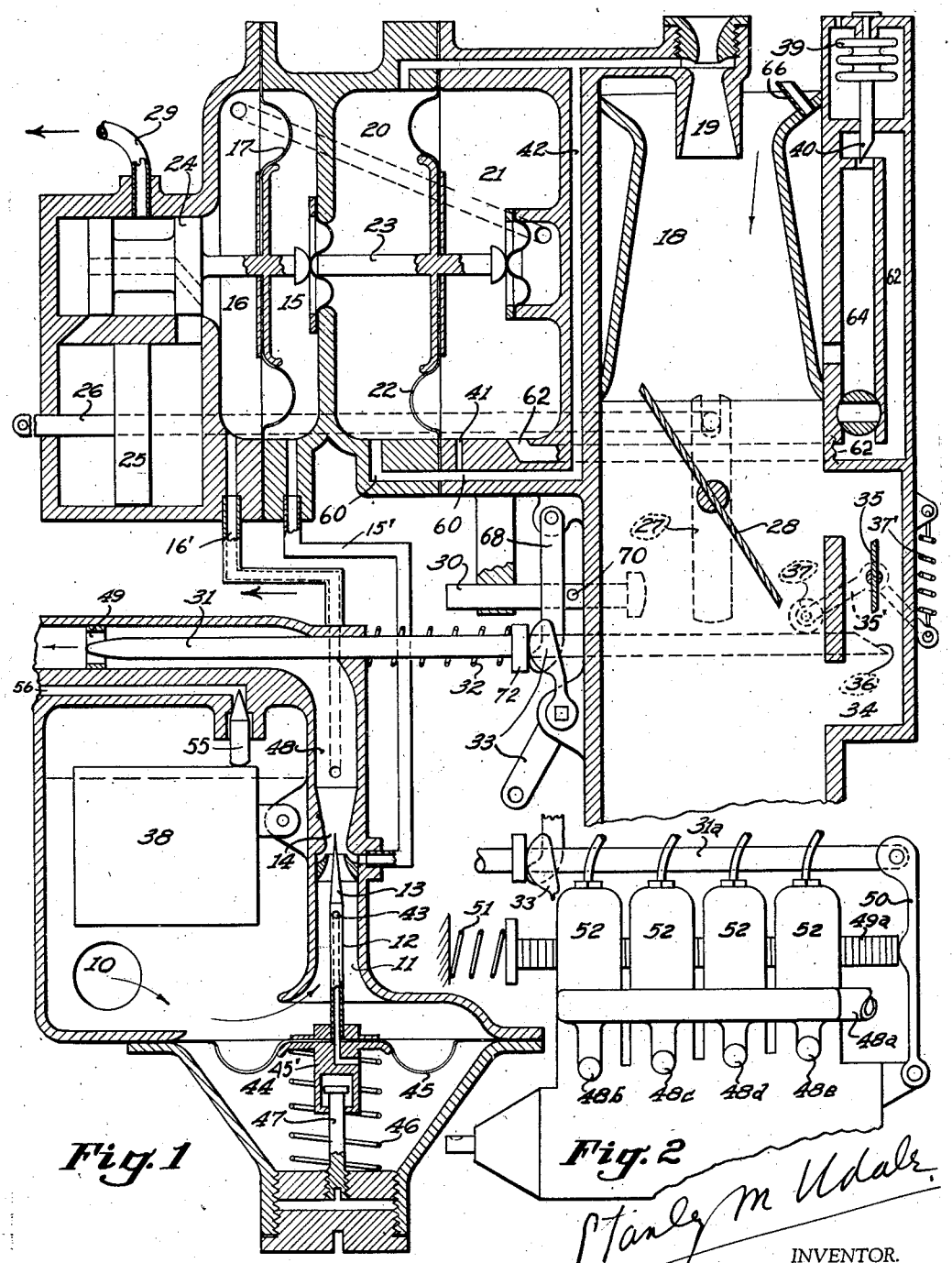

Oct. 28, 1947.    S. M. UDALE    2,429,781

FUEL CONTROL DEVICE

Filed Aug. 16, 1943

INVENTOR.

UNITED STATES PATENT OFFICE 2,429,781

FUEL CONTROL DEVICE

Stanley M. Udale, Detroit, Mich., assignor to George M. Holley and Earl Holley

Application August 16, 1943, Serial No. 498,858

1 Claim. (Cl. 261—48)

The object of this invention is to solve the acceleration problem with aircraft engines. I have discovered that if I reverse the usual connections in a carburetor so that, instead of opening an air throttle and creating pressure differences in the airstream and then relying on these pressure differences for the eventual opening of the fuel nozzle, the fuel nozzle is manually opened and the resulting increase in fuel flow causes the air throttle to open, then the problem of acceleration is to a great extent eliminated.

The Fig. 1 shows diagrammatically the elements of my invention. Fig. 2 shows the modifications necessary to apply my invention to a fuel injection pump.

Fuel enters the fuel control device under pressure at 10 and flows through a passage 11, in which there slides a cylindrical rod 12 having a tapered end 13 which projects into the throat of a venturi 14. The depression caused by the flow through the venturi 14 is communicated to a chamber 15 by means of a conduit 15' and the pressure in the outlet 48 from the venturi 14 is communicated to a similar chamber 16 by a conduit 16'. A diaphragm 17 separates the two chambers 15 and 16 and hence, responds to the flow of the fuel through venturi 14. The flow through the venturi 14 is controlled by a valve 31 and a restriction 49. This valve is under normal operating conditions manually operated by the lever 33.

In a similar way, air enters through the venturi 18 and creates in the small venturi 19 a depression which is communicated to the chamber 20. The chamber 21 is connected through the restricted opening 41 with a passage 60, which communicates through passage 42 with the chamber 20 and with the throat of the small venturi 19. Chamber 21 also communicates through the unrestricted passage 62 with the chamber 64, which chamber is subjected to the pressure in the air entrance through the impact tubes, one of which, 66, is shown.

The valve 40 separates the chamber 64 from the passage 62 and, at altitude, the bellows 39 expands and the valve 40 descends and the connection between chamber 64 and passage 62 becomes restricted in a well-known manner, so that the pressure in chamber 21 falls and the pressure difference acting on the diaphragm 22 falls. The pressure in the air entrance is communicated to the chamber 21 and a diaphragm 22, similar to diaphragm 17, separates the two air chambers. This pressure in the air entrance to the venturi 18 is transmitted past the valve 40.

The small diaphragm to the right of the end of the rod 23 and the corresponding one at the left of the other end of rod 23 are subjected to the difference in pressure in the venturi 14 and to the difference in pressure created by the venturi 18. The net result is that the small diaphragms exert no appreciable influence on the action of the two large diaphragms 17 and 22. Rod 23 connects the two diaphragms 17 and 22 together. The rod operates a servomotor valve 24. Movement of the servomotor valve allows fuel in the chamber 16 to operate, or rather control the motion of, a servomotor piston 25 which is connected through a rod 26 with the throttle lever 27 which controls the throttle 28. The fuel under pressure operates the piston 25, and low pressure fuel escapes through the passage 29. The servomotor valve 24 is balanced by a passage through the center shown in broken lines; hence, the high pressure acts on both ends and low pressure exists in the central groove in the valve. Both pressures are thus in balance and the valve 24 is free to respond to the Venturi pressure differences acting on the diaphragms 17 and 22. Obviously, when the throttle 28 approaches its wide open position, say 85°, the further opening of the valve to, say 95°, has no practical influence on the flow of air. During this movement of 10°, the throttle lever 27 engages with a rod 30 and closes the fuel control needle 31, so that although the manually operated lever 33 is set for the wide open position of the valve 31, the fuel is restricted by the partial closure of the needle 31. When the throttle lever 27 approaches the wide-open position, it engages with the right-hand end of the pin 30, which pin carries a cross-pin 70, which engages with a lever 68, which engages with a shoulder 72 on the pin 31. The movement of the needle 31 toward closed position is opposed by a compression spring 32. A bypass 34 controlled by an auxiliary air throttle 35 takes care of low speed operation. The throttle 35 is controlled by a lever 35' carrying a roller 37, which is held in engagement with the side of the needle 31 by a spring 37'. The contour 36 at the end of the needle 31 engages with a roller 37 to determine the position of the throttle 35 as the needle 31 approaches its position for low speed operation.

A vapor separator 38 takes care of vapor and air bubbles in the fuel entrance 10. The level of fuel relative to float 38, as it rises above the line indicated on the drawing, closes the float needle 55 and as it falls below the line indicated, the needle 55 opens and allows the vapor to escape through the passage 56. In such a fuel system operating under pressure the float must be arranged to open and close the needle, but this vapor separation means is no part of this invention and the showing is diagrammatic only as far as this feature is concerned. A barometric element 39 in the air entrance controls a valve 40 which modifies the pressure difference between the two chambers 20 and 21. A restricted opening 41 between the passage 42 and the chamber 21 subjects the chamber 21 to partial subatmospheric pressure. At high altitudes the barometric element 39 expands and the valve 40 descends and therefore the pressure in 21 is reduced below atmospheric pressure so as to compensate for the fall in the density of the atmospheric air. In order to take care of the need for a richer mixture at high fuel flows, the rod 12 is longitudinally drilled, and communicates with a chamber 44 and the annular fuel passage 11 through an opening 43. Therefore, the depression in the annular passage 11 is communicated to the chamber 44 which is separated from the fuel entrance 10 by a diaphragm 45, which diaphragm is supported by the spring 46. An adjustable rod 47 engages a diaphragm supported member 45' and limits the travel of the diaphragm in both directions.

In Fig. 2, the rod 31a corresponds to needle valve rod 31 of Fig. 1, and the fuel passage 48a corresponds to the fuel passage 48 of Fig. 1. The fuel flows to the fuel manifold 48b, 48c, 48d, and 48e, and the rod 31a engages with a lever 50 which engages with a rack 49a which is pushed to the right by the compression spring 51. This rack controls the flow from the individual fuel injector pumps 52 in a well known manner.

This application is a continuation in part of my pending application Ser. #334,328, filed May 10, 1940, notice of allowance November 2, 1942, the application being withheld from issue.

*Operation*

In the operation of the carburetor, when the lever 33 is rotated clockwise, the needle 31 restricts the fuel flow through the restriction 49. Then the roller 37 engages with the inclined surface 36 of the needle 31, and throttle 35 is closed. Needle 31 is therefore adjusted empirically for the low speed operation of the engine. When the lever 33 is manually moved in the opposite direction and fuel valve 31 is pushed to the right by the spring 32, the throttle 28 is eventually put in a wide open position. The small venturi 19 creates the necessary depression to render the automatic mechanism operative as follows:

The increased fuel flow through the passages 11 and 48 causes an increased pressure difference between the two chambers 15 and 16, which moves the servomotor valve 24 to the right. Fuel under pressure then flows from chamber 16, through the passage in valve 24 and to the left of piston 25 which then moves to the right and opens the throttle 28. The fuel to the right of the piston 25 then escapes around the valve 24 and through the passage 29. When equilibrium is reached, the valve 24 then moves to neutral position and only a very small quantity of fuel escapes through the passage 29 under these conditions.

Flow through the venturi 14 creates the pressure difference necessary to balance the pressure difference created by the airflow through the air venturi 19. The diaphragm 45 is then in its upper position engaged with the lower side of the stop 47. When the fuel flow passing the opening 43 in the rod 12 exceeds a predetermined amount, the pressure in the chamber 44 decreases and the compression of the spring 46 is overcome, the diaphragm 45 descends, and finally engages with the topside of the stop 47. The needle valve 13 is then in the position for the maximum rich mixture and the fuel-air ratio then reaches a maximum ratio since it takes more fuel flow when the needle 13 is in its lowered position to balance a given airflow.

In Fig. 2, as the flow through the fuel manifold 48b, 48c, 48d, and 48e, increases as the rack 49a moves to the right, the fuel flow eventually creates a larger flow than can be balanced by the air flow so that it is necessary to restrict the fuel flow. This is accomplished by the compression of the spring 51 by the rod 30 which engages with the rod 31a as before and moves the rod 31a to the left to reduce the fuel flow by moving the rack 49a to the left.

Specifically, anti-clockwise rotation of lever 33 reduces the discharge per revolution; hence, the flow through the pipe 48a, hence, the depression in the venturi 14 and hence, there is a reduction in the air flow to balance the reduction in the fuel flow caused by the action of the servomotor 25, servomotor valve 24 and diaphragms 17 and 22.

What I claim is:

In a fuel-air mixture ratio control device, a fuel entrance, a restricted fuel passage therein, a fuel outlet passage leading therefrom, a fuel throttle valve therein, a fuel throttle lever therefor, an air entrance, an air venturi therein, an air outlet, air throttling means located in said outlet, means responsive to the pressure difference created by said restriction in said fuel passage, additional means responsive to a similar pressure difference created by said air venturi adapted to balance the first-mentioned pressure difference, means responsive to both of said opposing means adapted to open said air throttle in response to an increase in fuel flow, means responsive to the opening of said air throttle to its wide-open position to throttle said fuel flow independently of said fuel throttle lever, a bypass around the air throttle, a second air throttle in said bypass, and mechanical means for interconnecting said second throttle with the fuel throttle valve whereby the flow of air in said bypass is mechanically controlled by the initial opening of said fuel throttle valve.

STANLEY M. UDALE.

REFERENCES CITED

The following references are of record in the file of this patent:

UNITED STATES PATENTS

| Number | Name | Date |
|---|---|---|
| 1,333,986 | Lundgaard | Mar. 16, 1920 |
| 2,223,381 | Mock | Dec. 3, 1940 |
| 2,269,294 | Udale | Jan. 6, 1942 |
| 2,224,472 | Chandler | Dec. 10, 1940 |
| 2,324,599 | Schorn | July 20, 1943 |

FOREIGN PATENTS

| Number | Country | Date |
|---|---|---|
| 543,260 | Great Britain | Feb. 17, 1942 |
| 113,026 | Australia | May 2, 1941 |